United States Patent
Barany et al.

(10) Patent No.: US 11,627,282 B2
(45) Date of Patent: Apr. 11, 2023

(54) PASSIVE ENTRY ADAPTER SYSTEM FOR A CATV NETWORK

(71) Applicant: PPC BROADBAND, INC., East Syracuse, NY (US)

(72) Inventors: David A. Barany, Syracuse, NY (US); Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 146 days.

(21) Appl. No.: 16/839,142

(22) Filed: Apr. 3, 2020

(65) Prior Publication Data

US 2020/0322572 A1    Oct. 8, 2020

Related U.S. Application Data (60) Provisional application No. 62/828,506, filed on Apr. 3, 2019.

(51) Int. Cl.
| | |
|---|---|
| *H04N 7/173* | (2011.01) |
| *H04N 7/10* | (2006.01) |
| *H04N 21/61* | (2011.01) |

(52) U.S. Cl.
CPC .......... *H04N 7/104* (2013.01); *H04N 21/615* (2013.01); *H04N 21/6118* (2013.01)

(58) Field of Classification Search
CPC .. H04N 21/6118; H04N 21/615; H04N 7/104; H04N 7/106
See application file for complete search history.

(56) References Cited

U.S. PATENT DOCUMENTS

| | | | |
|---|---|---|---|
| 4,387,347 A | 6/1983 | Pierrot | |
| 8,356,322 B2 | 1/2013 | Wells et al. | |
| 9,837,966 B1* | 12/2017 | Ahmed | ................ H03F 1/0288 |
| 2004/0061565 A1* | 4/2004 | Austin | ................ H03B 5/1852 |
| | | | 331/177 V |
| 2010/0146564 A1* | 6/2010 | Halik | ..................... H04N 7/104 |
| | | | 725/127 |

(Continued)

OTHER PUBLICATIONS

Lee Young (Authorized Officer), International Search Report and Written Opinion dated Jun. 30, 2020, PCT Application No. PCT/US2020/026506, 23 pages.

*Primary Examiner* — Gigi L Dubasky
(74) *Attorney, Agent, or Firm* — MH2 Technology Law Group LLP (57) ABSTRACT

A passive entry adapter system includes an external band rejection filter connected to an external network; an entry adapter connected to the external band rejection filter, an input port connecting the entry adapter to the external network; a directional coupler connected to the input port; a frequency-based signal separation device connected to a first terminal and comprising a high-pass terminal, and a low-pass terminal; a splitter connected to the high-pass terminal, where the splitter is configured to be connected to one or more first types of devices; and a broadband output port connected to a second terminal of the directional coupler. The broadband output is configured to be connected to one or more second types of devices. The entry adapter and the external band rejection filter are configured to prevent signals from a frequency band associated with in-network communications produced within an internal network from reaching the external network.

23 Claims, 5 Drawing Sheets

(56) References Cited

U.S. PATENT DOCUMENTS

| | | | |
|---|---|---|---|
| 2011/0010749 A1* | 1/2011 | Alkan | H05K 1/165 |
| | | | 725/127 |
| 2013/0125193 A1* | 5/2013 | Wells | H04N 21/6168 |
| | | | 725/127 |
| 2015/0304732 A1 | 10/2015 | Shapson et al. | |
| 2017/0013320 A1 | 1/2017 | Li et al. | |
| 2018/0007318 A1 | 1/2018 | Bailey et al. | |
| 2018/0233796 A1 | 8/2018 | Zhang et al. | |

* cited by examiner

Path loss chart:

| Device | Path/Freq | Loss |
|---|---|---|
| External MoCA filter | 5 – 1000MHz | -1.5dB |
| | 1125 – 1675MHz | -40 to -70c |
| Dir. Coupler | Thru – Com 5 – 1700MHz | -3.0dB |
| | Tap – Com 5 – 1700MHz | -7.7dB |
| | Thru – Tap port isolation | ≥25dB |
| 2 way split | Com – Out 5 – 1700MHz | -4.5dB |
| Diplex Filter | Com – High 1125 – 1675MHz | -1.0dB |
| | Com – High 5 – 1000MHz | -40dB |
| | Com – Low 5 – 1000MHz | -1.0dB |
| | Com – Low 1125 – 1675MHz | -40dB |
| 5 way split | Com – Out 5 – 1000MHz | n/a |
| | Com – Out 1125 – 1675MHz | -13.5dB |
| | Out port/port isolation | ≥16dB |

| Path/Freq | Loss |
|---|---|
| Input – Broadband output 5 – 1700MHz | -7.5dB |
| Input – MoCA only outputs 5 – 1000MHz | ≥-40dB |
| 1125 – 1675MHz | ≥-30dB |
| MoCA out – Broadband out 5 – 1000MHz | ≥-30dB |
| 1125 – 1675MHz | -27dB |

PASSIVE ENTRY ADAPTER SYSTEM FOR A CATV NETWORK

CROSS-REFERENCE TO RELATED APPLICATIONS

This application claims priority to U.S. Provisional Patent Application 62/828,506, which was filed on Apr. 3, 2019, and is incorporated herein by reference in its entirety

BACKGROUND

Multimedia over Coax Alliance (MoCA) refers to specifications for networking over coaxial cable. MoCA uses a household's existing coax cable to transfer network data quickly and efficiently throughout the home. More specifically, MoCA uses existing coax cable for reliable, wired networking between devices without the need to install other types of network cable (e.g., Cat5 cable, Cat6 cable, etc.). A MoCA connection utilizes the unused frequency spectrum offered by cable network service providers to extend a network to the entire home using coax cable.

MoCA-enabled CPE (Customer Premise Equipment), such as a set-top-box, digital video recorder (DVR), etc., sends beacon carriers throughout the home's network looking for another CPE with which to establish a connection (e.g., within the home's internal local network). Certain CPEs may include "MoCA-only" devices, which are devices in which communications between the MoCA-only devices are intended to remain within the internal network rather escaping to external networks via the cable network provider's broadband connection. Example "MoCA-only" devices may include client DVRs that communicate with a server DVR for accessing content (e.g., recorded television) stored on the server DVR.

Due to the high output power of MoCA-only signals, data can be unintentionally transmitted to a different external network, outside of the home's internal local network. That is, MoCA-only signals can escape from the intended subscriber's home network and enter the networks of other homes nearby via broadband network. Accordingly, MoCA filters are installed at the Point of Entry (PoE) between a home's internal network and a cable provider's network to prevent such issues such that communication signals sent and received by MoCA-only devices remain with the home's internal network.

In some installations, MoCA passive devices use internal filters to isolate a MoCA internal home network from the cable network's broadband signals. This filtering current restricts the frequency spectrum seen by customer premises broadband equipment (such as a DVR/controller and modems), thus preventing MoCA-only signals from escaping a home's internal local network.

SUMMARY

In one example embodiment, a passive entry adapter system for a cable-television (CATV) network, includes an external band rejection filter configured to be connected to an external network; an entry adapter connected to the external band rejection filter, an input port connecting the entry adapter to the CATV network via the external band rejection filter; a single directional coupler, the single directional coupler being connected to the input port and attenuating signals based on signal direction; a frequency-based signal separation device connected to a first terminal, the frequency-based signal separation device comprising a high-pass terminal, and a low-pass terminal; a splitter connected to the high-pass terminal of the frequency-based signal separation device. The splitter is configured to be connected to one or more first types of devices; and at least one broadband output port connected to a second terminal of the directional coupler. The broadband output is configured to be connected to one or more second types of devices. The entry adapter and the external band rejection filter are configured to prevent signals from a frequency band associated with in-network communications produced within an internal network from reaching the external network.

In an example embodiment, a system includes: a band rejection filter configured to be connected to an external network; and an entry adapter connected to the band rejection filter, the entry adapter configured to be connected to one or more first types of devices and one or more second types of device that communicate with each other via network signals within a customer premises local network. The entry adapter is configured to pass the network signals within a first frequency band between the one or more first types of devices and the one or more second types of devices, to terminate signals transmitted between the one or more first types of devices and the one or more second types of devices at a second frequency band lower than the first frequency band, and to attenuate the network signals within the second frequency band from reaching the input port from the second types of devices. The band rejection filter is configured to filter the network signals within the second frequency band to prevent the network signals from reaching the external network.

In an example embodiment, a system includes: a band rejection filter connected to an external network and physically remote and outside of a customer premises. The band rejection filter is configured to prevent signals from a frequency band associated with internal network communications from reaching the external network. The system further includes an entry adapter connected to the external network via the band rejection filter, the entry adapter comprising a directional coupler to split an input signal from the external network into two legs, the first leg connecting to one or more first types of devices and the second leg connecting to one or more second types of devices, the one or more first types of devices. The directional coupler is configured to: permit communications between the one or more first types of devices and the external network, permit communications between the one or more first types of devices and the one or more second types of devices via an internal network; and prevent communications between the one or more second types of devices and the external network.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

A cable network provider may provide cable television and/or broadband network connection services to a customer. As part of receiving cable television services, a customer's internal network may include "MoCA-only" devices which are devices whose communications are intended to remain within the internal network rather than escaping to external networks via the cable network provider's broadband connection. Examples of MoCA-only devices may include client multimedia devices that access live broadcasted television and/or streamed content via a host multimedia device.

MoCA passive devices utilize a filter at a Point of Entry (PoE) input to split or combine standard "broadband" signals (standard cable network signals provided by a cable network service provider) from internal isolated MoCA-only devices, thus preventing MoCA-only signals (e.g., communications between MoCA-only devices) from escaping a customer's internal network. In other words, MoCA passive devices are used to prevent MoCA-only signals from one customer's network from reaching another customer's network. As an illustrative example, a MoCA passive device may prevent a situation in which one cable network customer's recorded television program can be seen and accessed by another cable network customer. A MoCA passive device may contain MoCA-only signals within the customer's internal network by filtering out signals sent by MoCA-only devices from a particular frequency band used to carry broadband signals (e.g., five Megahertz (MHz) to 1000 MHz).

The drawback of MoCA passive devices using PoE filters is that such devices may limit the frequency spectrum of broadband network signals delivered to the customer premise equipment (CPE). Further, the frequencies filtered by the MoCA PoE filter are fixed and non-variable. As such, MoCA PoE filters will have to be replaced as the spectrum of frequencies are expanded to deliver more services. This can be inconvenient as it would require the customers themselves to change the MoCA PoE filters, or send technicians to each customer premise to change the filters. For example, if a currently installed MoCA PoE filter is designed to filter signals from five MHz to 1000 MHz, but the frequency spectrum of broadband network signals is expanded to include frequencies up to, for example, 1200 MHz, then each MoCA PoE filter at each customer premises will have to be replaced to accommodate for this expanded range of frequencies, thus resulting in the expenditure of significant time and money.

Accordingly, aspects of the present disclosure include a system that provides passive splitting/combining functions without having a designed-in filter at the PoE input. Instead, an external MoCA band rejection filter 210 is provided outside of the customer's premise (e.g., at a demarcation box that may serve multiple customers). As a result, in the event that the spectrum of frequencies changes or expands, there is no need for filters at each customer location to be changed (either by the customers themselves or by sending technicians to customers' premise). Instead, the external MoCA band rejection filter 210 can be more conveniently changed outside of the customer premise, and fewer filters will need to be changed as each filter may serve multiple customers.

As further described herein, aspects of the present disclosure provide a diplex filter that filters a network signal with MoCA-only data (e.g., data that is intended to be communicated to MoCA-only devices and to remain within a customer premises local network). More specifically, the diplex filter includes a high-pass terminal, and a low-pass terminal. In some implementations, the high-pass terminal allows high-frequency portions of the network signal (e.g., frequencies that carry MoCA-only data) to pass. The low-pass terminal passes low-frequency portions of the network signal through a resistor and terminating to ground, thus substantially attenuating the low-frequency portions of the network signal (e.g., the low-frequency portions that carry broadband signals). In this way, portions of the network signal having MoCA-only data remain within the customer premises local network and are not "seen" by the broadband network since the low-frequency portions that carry broadband signals are substantially attenuated.

Figure 1A:
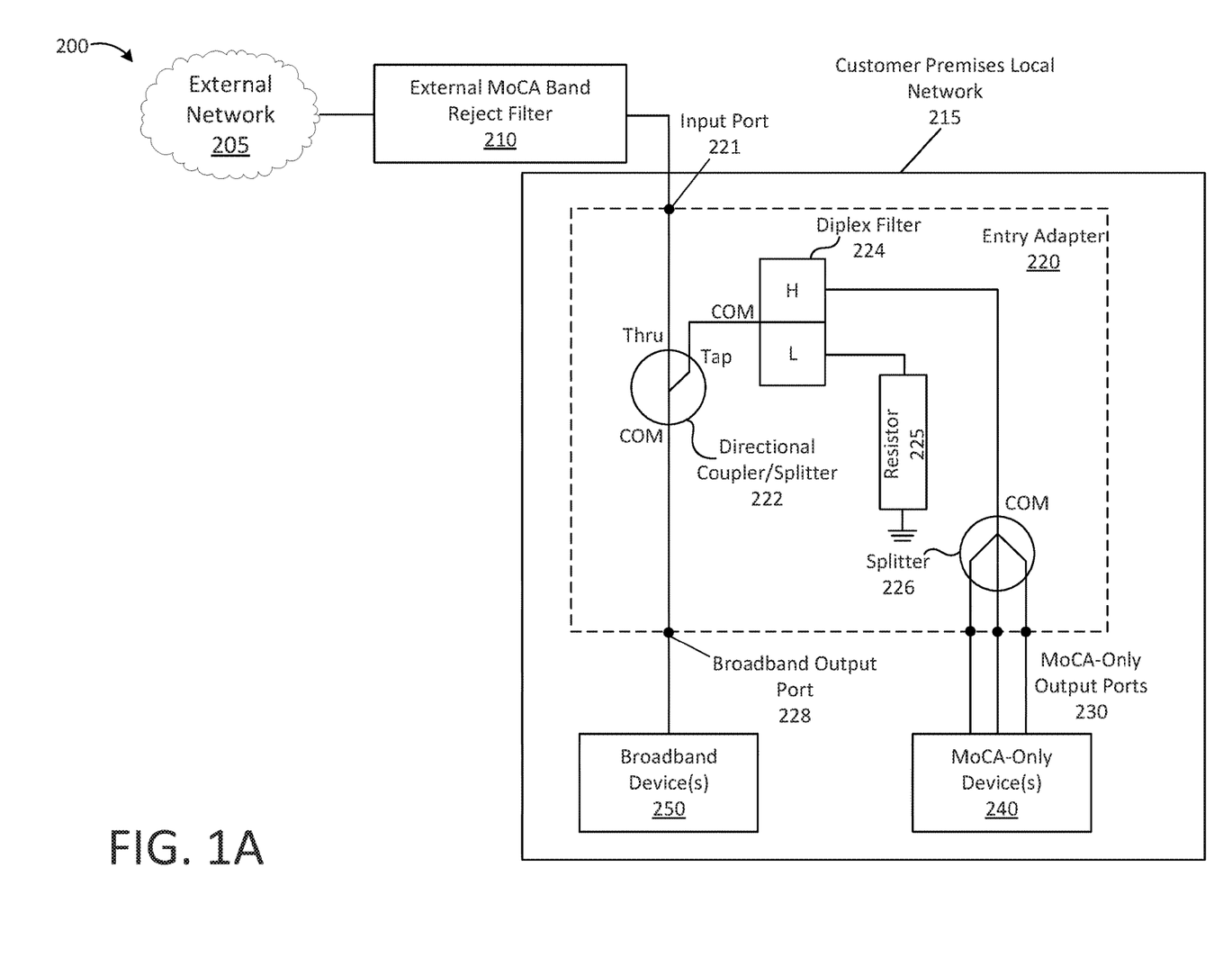
FIG. 1A illustrates an overview of an example environment and implementation in accordance with aspects of the present disclosure.
Figure 1B:
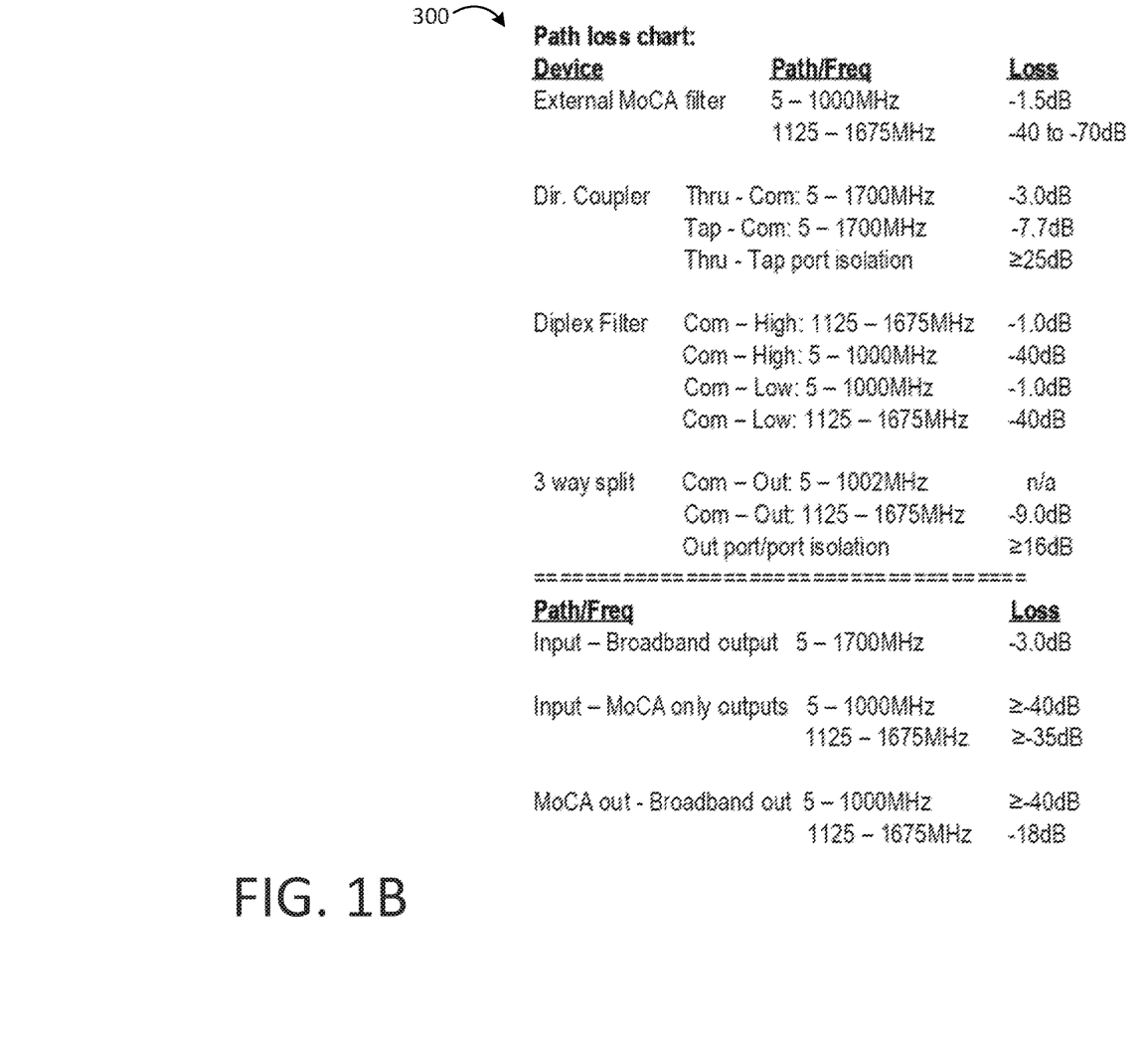
FIG. 1B illustrates a table that summarizes example filtering properties of one or more filtering devices used in the environment of FIG. 1A and an amount of loss produced between different connection paths within the environment of FIG. 1A.

FIG. 1A shows an overview of an example environment and implementation in accordance with aspects of the present disclosure. FIG. 1B shows a table 300 that summarizes example filtering properties of one or more filtering devices used in the environment 200 and an amount of loss produced between different connection paths within the environment 200. These example filtering properties and path loss values are referred to as part of the description of environment 200 shown in FIG. 1A.

As shown in FIG. 1A, the environment 200 may include an external network 205, an external MoCA band rejection filter 210, a customer premises local network 215, an entry adapter 220, one or more MoCA-only devices 240, and one or more broadband devices 250. As shown in FIG. 1A, the customer premises local network 215 may include the entry adapter 220, the MoCA-only devices 240, and the broadband devices 250.

The external network 205 may include a cable television network and/or a cable broadband network provider (e.g., an Internet Service Provider), or the like. The external network 205 may provide Internet connection services and/or cable television services to a customer. More specifically, the external network 205 connects to the customer premises local network 215 to provide a customer's broadband device 250 with Internet connection services and/or cable television services.

As further shown in FIG. 1A, the external network 205 is connected to the external MoCA band rejection filter 210, and the external MoCA band rejection filter 210 is connected to the entry adapter 220 in the customer premises local network 215 (e.g., via an input port 221), thereby providing the customer premises local network 215 with connectivity to the external network 205. The entry adapter 220 may include, for example, a 5-port splitter, or in one or more alternative embodiments, the entry adapter 220 may include a different number of ports. In the example shown in FIG. 1A, the entry adapter 220 includes five ports (e.g., the input port 221, a broadband output port 228, and three MoCA-only output ports 230). The entry adapter 220 may further include a directional coupler/splitter 222, a diplex filter 224 (e.g., a frequency-based signal separation device), a resistor 225, and a splitter 226. In embodiments, the directional coupler/splitter 222 splits the connection from the input port 221 to the broadband output port 228 and to the diplex filter 224. As described herein, the directional coupler/splitter 222 may attenuate signals based on signal direction (e.g., instead of attenuation based on frequency). The broadband output port 228 connects to the one or more devices of one type (e.g., broadband devices 250). In some implementations, the diplex filter 224 includes a high-pass terminal (H) and a low-pass terminal (L). The low-pass terminal may be terminated to ground via the resistor 225. In some embodiments, the resistor may prevent or reduce reflections of signals from the low-pass terminal. The high-pass terminal may be connected to the splitter 226, and the splitter 226 include the three MoCA-only output ports 230. As further shown in FIG. 1A, the MoCA-only output ports 230 may connect to one or more devices of another type (e.g., the MoCA-only devices 240). In some embodiments, the MoCA-only devices 240 may communicate via an internal network (e.g., the customer premises local network 215) and the broadband devices 250 may communicate via the internal network and the external network. In one example embodiment, the MoCA-only devices 240 may communicate only via the internal network such that communications signals produced by the MoCA-only devices 240 do not reach the external network 205.

As further described herein, the entry adapter 220 may provide one more broadband devices 250 within the customer premises local network 215 with connectivity to the external network 205 (e.g., to access Internet services, cable TV services, etc.). In addition, the entry adapter 220 may provide the MoCA-only devices 240 with connectivity to each other and to the broadband devices 250 within the customer premises local network 215, while blocking MoCA-only signals produced by the MoCA-only devices 240 from reaching the external network 205 (e.g., such that the MoCA-only signals do not reach a different customer's network). As described in greater detail herein, the broadband output port 228 allows access to the external network 205, and the MoCA-only output ports 230 prevent access to the external network 205.

In embodiments, the entry adapter 220 includes multiple connection paths between the external MoCA band rejection filter 210, the directional coupler/splitter 222, the diplex filter 224, the splitter 226, the input port 221, the broadband output port 228, and the MoCA-only output ports 230. The entry adapter 220 filters signals through these paths using the directional coupler/splitter 222, the diplex filter 224, and the splitter 226 in a manner which permits broadband signals to traverse between the external network 205 and the broadband devices 250, and prevents MoCA-only signals from reaching the external network 205. For example, the frequency of signals filtered by each device and the amount of loss provided at each path is shown in table 300 of FIG. 1B and described in greater detail herein.

The external MoCA band rejection filter 210 may include a filter that is provided offsite (e.g., external to or outside of the customer premises local network 215) and filters MoCA-only signals (e.g., communications between MoCA-only devices 240), thereby blocking the MoCA-only signals from reaching the external network 205. More specifically, the external MoCA band rejection filter 210 may filter signals outside of the frequency spectrum that carry signals associated with cable television and/or broadband connection services. As an example, and referring to FIG. 1B, the external MoCA band rejection filter 210 may filter a relatively high frequency range (e.g., 1125 megahertz to 1675 MHz) that carry MoCA-only signals, but do not carry broadband signals associated with cable television and/or broadband connection services (e.g., signals in a low frequency range, such as five to 1000 MHz). In this way, the external MoCA band rejection filter 210 filters MoCA-only signals produced by the broadband devices 250 to prevent these MoCA-only signals from reaching the external network 205 (e.g., such that the MoCA-only signals remain within the customer premises local network 215, as described in greater detail herein). In embodiments, the external MoCA band rejection filter 210 may be implemented outside of the customer's premises (e.g., at a demarcation box) for easy replacement (e.g., if the broadband frequency range is expanded). Also, in one or more alternative implementations, the external MoCA band rejection filter 210 may connect to multiple customer premise sites, such that only one external MoCA band rejection filter 210 may need to be replaced for multiple customers in the event the broadband frequency range is expanded.

The MoCA-only devices 240 may include one more multimedia devices that communicate with each other and with one or more broadband devices 250 within the customer premises local network 215. In some implementations, the MoCA-only devices 240 may include a set-top-box that accesses content (e.g., audio content, video content) from the broadband device 250 (e.g., live streamed content, stored content, recorded content, etc.). In some implementations, the MoCA-only devices 240 may be considered client devices that access the content from a host broadband device 250. As described herein, a MoCA-only device 240 may produce MoCA-only signals when communicating with other devices within the customer premises local network 215 (e.g., to discover a host broadband device 250, access content via the host broadband device 250, broadcast a discovery signal so that the MoCA-only device 240 may be discovered by a broadband device 250 and/or other MoCA-only devices 240 within the customer premises local network 215, etc.). These MoCA-only signals may be filtered by the external MoCA band rejection filter 210 and/or the entry adapter 220 such that the MoCA-only signals remain within the customer premises local network 215 and do not reach the external network 205 and thus, do not potentially reach a different customer's network.

The broadband devices 250 may include one or more multimedia devices, set-top-boxes, a cable box, digital video recorders (DVRs), network devices, routers, switches, modems, hubs, or the like. In some implementations, the broadband devices 250 may access the external network 205 to access content (e.g., Internet content, cable network television content, etc.). Additionally, or alternatively, a broadband device 250 may be a host multimedia device that streams content to one or more client MoCA-only devices 240 (e.g., live broadcasted cable TV content, internet content, stored/recorded content, etc.).

As shown in FIG. 1A, the external MoCA band rejection filter 210 may connect to the customer premises local network 215 via a coax connection at an input port 221 of the entry adapter 220. In some implementations, the entry adapter 220 splits an input signal from the input port 221 into multiple outputs provided at output ports (e.g., broadband output port 228 and MoCA-only output ports 230). In some implementations, one or more broadband devices 250 may be connected to the entry adapter 220 via the output port 228, and one or more MoCA-only devices 240 may be connected to the entry adapter 220 via the MoCA-only output ports 230. As described herein, a host broadband device 250 connected to the broadband output port 228, such as a DVR device, may communicate via MoCA frequencies to one or more client MoCA-only devices 240. Also, one or more MoCA-only devices 240 may communicate via MoCA frequencies with each other.

In operation, the entry adapter 220 permits the broadband devices 250 to communicate with the MoCA-only devices 240 and to access the external network 205. Further, the entry adapter 220 prevents communications of the MoCA-only devices 240 from exiting the customer premises local network 215. More specifically, in operation, a broadband signal received at the input port 221 (e.g., from the external network 205) may pass through the entry adapter 220 to minimize signal loss from the input to broadband output path loss. Thus, any broadband device 250 connected to the broadband output port 228 will be able to "see" (e.g., detect and access) the full cable network signal spectrum received at the input port 221 (thus allowing the connected broadband devices 250 to access the external network 205 to receive cable television and/or Internet connectivity services). For example, referring to FIG. 1B, the loss from the input port 221 and the broadband output port 228 (e.g., from the path going from the input port 221, to the thru port of the directional coupler/splitter 222, to the common (COM) port of the directional coupler/splitter 222, to the broadband output port 228) is −3 dB only, thus allowing the connected broadband devices 250 to access the external network 205.

Further, in operation, a host broadband device 250 may generate a network signal, for communicating with a MoCA-only device. (e.g., to discover a MoCA-only device 240. stream content to the MoCA-only device 240, etc.). That is, when communicating with the MoCA-only device 240, the host broadband device may generate a network signal having "MoCA-only data" that should remain within customer premises local network 215 (e.g., data that is intended to be received or "seen" only by devices within the customer premises local network 215).

The network signal may enter the common (COM) port of the directional coupler/splitter 222 with a portion of the network signal sent to the input port 221 (via the thru port of the directional coupler/splitter 222) and another portion sent to the directional coupler/splitter 222 tap port. The network signal sent to the input port 221 may travel towards the external network 205; however, the external MoCA band rejection filter 210 reflects the MoCA-only frequencies of the network signal back to the input port 221 and prevents the MoCA-only frequencies of the network signal from entering the external network 205, thus preventing MoCA-only data from the network signal from entering the external network 205.

In some implementations, the network signal at the directional coupler/splitter 222 tap port may pass through a diplex filter 224 having a high-pass filter (H) and a low-pass filter (L) connected to resistor 225. As shown in FIG. 1B, the high-pass filter allows high frequencies that carry MoCA-only signals to pass (e.g., 1125 MHz-1675 MHz), while filtering low frequencies that carry broadband signals (e.g., from five MHz to 1000 MHz, by causing a 40-dB loss at these frequencies). The MoCA-only signal (e.g., from the high-pass filter) may then be distributed through a splitter 226 (e.g., a three-way splitter) through which the MoCA-only signal is received by the connected client MoCA-only devices 240 (e.g., via the MoCA-only output ports 230). The low-pass filter (L) allows the low frequencies of the network signal to pass (e.g., the frequencies that carry broadband signals), and these low-frequencies are passed through the resistor 225 and to ground, thus substantially attenuating the low frequency portion of the network signal.

Network signals generated by the MoCA-only devices 240 (e.g., for communicating with other MoCA-only devices 240 and/or the broadband devices 250) may return to the MoCA-only output ports 230 and may be combined together through the splitter 226. Subsequently, these network signals may be passed through the diplex filter 224 to filter out low frequencies (e.g., the non-MoCA-only signals), and present the remaining signal (e.g., MoCA-only signals) to the broadband device 250 via the broadband output port 228, thus completing the MoCA communications loop. As low frequencies are filtered out, communications that are intended to be carried through MoCA-only frequencies (e.g., high frequencies) are prevented from reaching the external network 205.

As shown in FIG. 1A, the entry adapter 220 may include a signal directional coupler/splitter 222. In one example embodiment, this directional coupler/splitter 222 may be the only directional coupler/splitter 222 in the entry adapter 220. As such, signals traveling between the broadband devices 250 and the external network 205 may have minimal loss, as shown and described in greater detail with respect to FIG. 1B.

In some implementations, the MoCA-only devices 240 may provide a relevantly high amount of radio frequency (RF)/electrical isolation from any energy on the MoCA-only output ports 230 from reaching the input port 221. This prevents any spurious frequencies that may be on the MoCA-only ports 230 from entering the external network 205.

Referring to FIG. 1B, in some implementations, the entry adapter 220 may provide approximately 25 decibels (dB) of isolation (e.g., at the Thru-Tap port path), which may serve, along with a loss of splitter 226 (of about 9 dB), to provide sufficient amount of isolation from the MoCA-only ports 230 to the input port 221. In some implementations, the high-pass terminal of the diplex filter 224 may provide sufficient filtering to further limit the lower frequency energy (e.g., below 1000 MHz) that may be present on the MoCA-only ports 230 from getting to either the external network 205 or any broadband device 250 device connected to the broadband output port 228. The low-pass terminal of the diplex filter 224 may be terminated to ground via a resistor 225, thereby avoiding reflections and providing a consistent return loss to the broadband output port 228 to facilitate functionality of the broadband devices 250. In some implementations, the resistor 225 may have a resistance of 75 ohms, or may have any other suitable resistance.

As further shown in FIG. 1B, from the path between the input port 221 and the MoCA-only output ports 230, the entry adapter 220 (e.g., through the filtering properties and arrangement of the directional coupler/splitter 222, the diplex filter 224, the resistor 225, and the splitter 226) provides a loss of greater than or equal to 40 dB for frequencies between five MHz and 1000 MHz for, and a loss of greater than or equal to 35 dB for frequencies between 1125 MHz and 1675 MHz. That is, the entry adapter 220 substantially attenuates communication signals in the path from the MoCA-only output ports 230 and the input port 221, thus preventing any communication signals from the MoCA-only devices 240 from reaching the external network 205. Further, from the path between the MoCA-only output ports 230 and the broadband output port 228, the entry adapter 220 provides a loss of greater than or equal to 40 dB for frequencies between five MHz and 1000 MHz, and a loss of 18 dB for frequencies between 1125 MHz and 1675 MHz. That is, the entry adapter 220 permits communications to occur between the broadband devices 250 and the MoCA-only device 240 via MoCA-only signals (e.g., signals in the 1125 MHz to the 1675 MHz range).

By using the entry adapter 220 within the customer premises local network 215 and the external MoCA band rejection filter 210, MoCA-only signals remain within the customer premises local network 215, as any MoCA-only signals that exit the customer premises local network 215 (e.g., via the input port 221) are reflected back by the external MoCA band rejection filter 210. In this way, MoCA-only signals from one customer's local network does not reach another customer's local network, without the need for an on-site PoE filter.

As described herein, different configurations of the entry adapter 220 may be implemented. As one example, referring to FIG. 2, the directional coupler/splitter 222 may include a microstrip directional coupler having a pair of parallel conductors as shown. The parallel conductors may be relatively close in proximity and include gap that may emulate the behaviors of high-pass and low-pass terminals as described herein. For example, the gap may be such that signals having a threshold frequency may pass from one of the conductors to the other. The larger the gap, the higher the frequency is needed in order for the signal to pass from one conductor to the other. Using this phenomena, the directional coupler/splitter 222 may incorporate the functions of high-pass and low-pass terminals, as is described herein.

Figure 2:
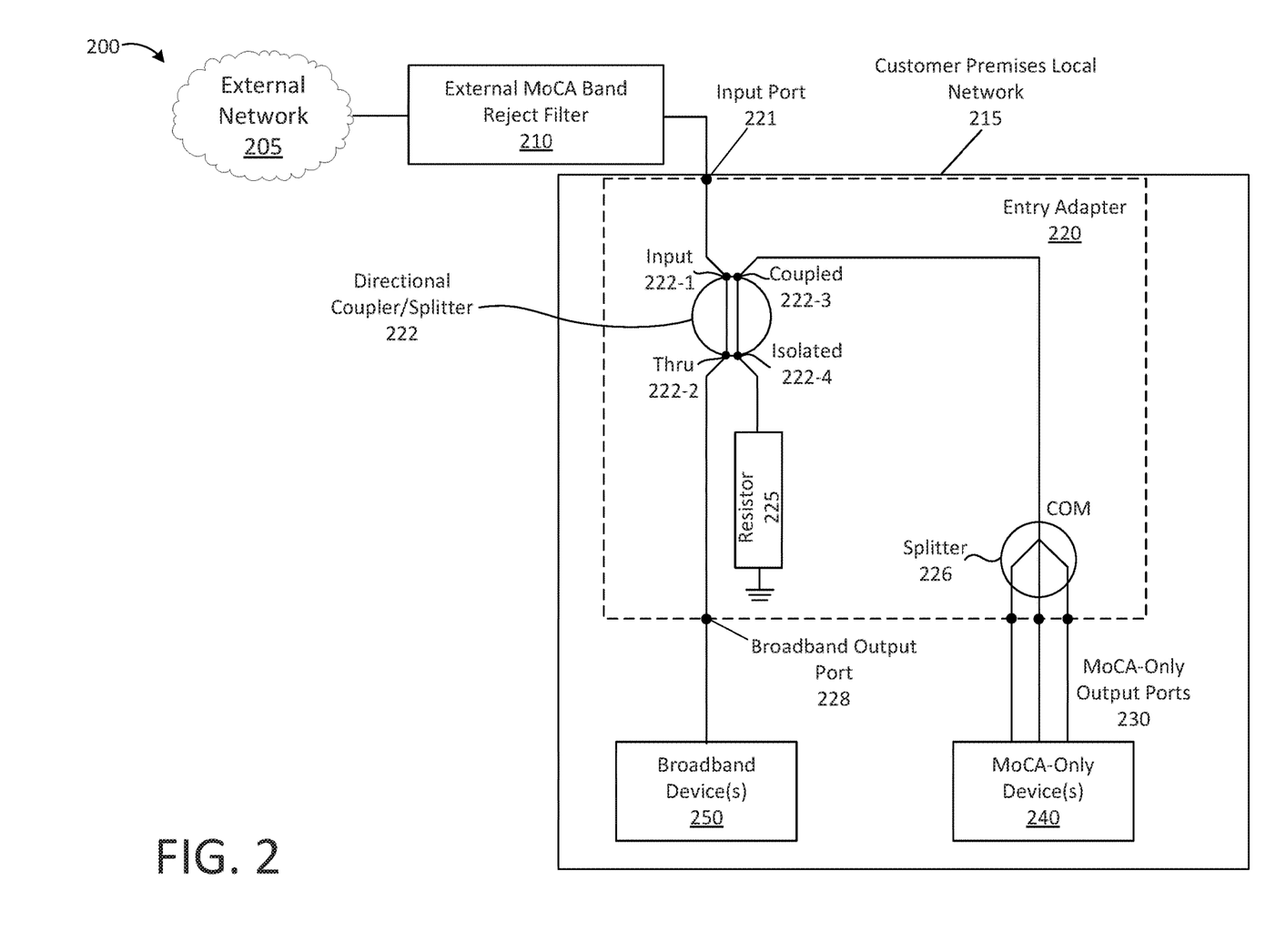
FIG. 2 illustrates an overview of an example environment and implementation in accordance with aspects of the present disclosure.

The directional coupler/splitter 222 may include an input port 222-1, a thru port 222-2, a coupled port 222-3, and an isolated port 222-4. The input port 222-1 and the thru port 222-2 may define a first leg connecting to the broadband devices 250. The input port 222-1 and the coupled port 222-3 define a second leg connecting to the MoCA-only devices 240. The input port 222-1 may connect to the input port 221 of the entry adapter 220 and receive signals from the external network 205. In some embodiments, signals from the input port 222-1 may pass through via the thru port 222-2 to the broadband devices 250. In some embodiments, signals ranging from 5 MHz to 1700 MHz may pass from the input port 222-1 to the thru port 222-2. In some embodiments, signals above a particular frequency may be transmitted across the gap formed by the parallel conductors through the coupled port 222-3, whereas signals below the particular frequency may be terminated through the isolated port 222-4 to the resistor 225. In this way, the directional coupler/splitter 222 incorporates the functions of a high-pass terminal by permitting signals of in a higher frequency band to pass, while terminating frequencies in a lower frequency band.

Figure 3A:
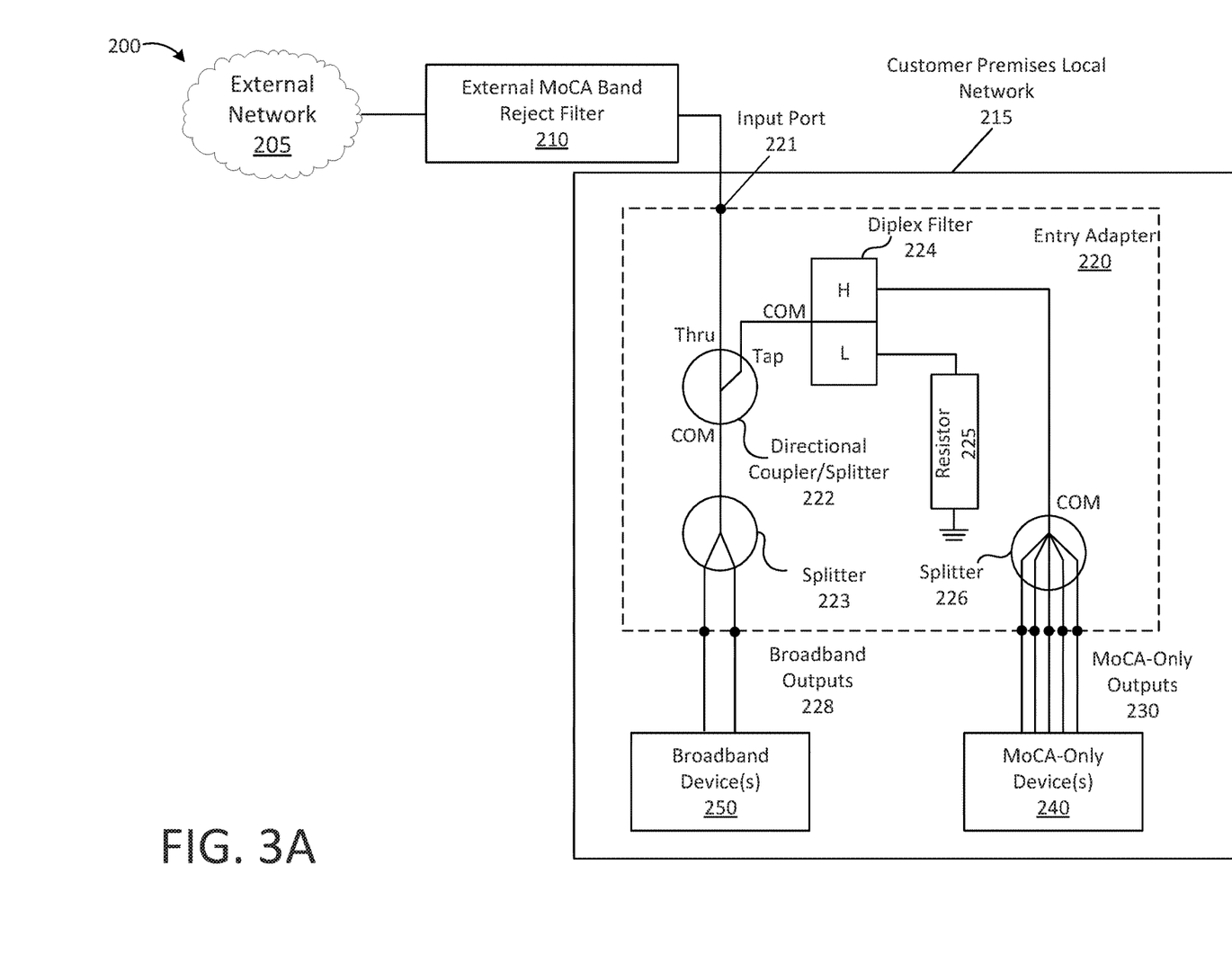
FIG. 3A illustrates an overview of an example environment and implementation in accordance with aspects of the present disclosure.

Other variations of the entry adapter 220 are possible, as described herein. For example, instead of a 5-port entry adapter 220 (as shown in FIG. 1A), the entry adapter 220 may include eight ports (e.g., to provide connectivity to additional MoCA-only devices 240 and/or broadband devices 250 in exchange for additional signal loss). Referring to FIG. 3A, the entry adapter 220 may be an 8-port splitter having one input port 221, two broadband output ports 228, and five MoCA-only output ports 230. In some implementations, the entry adapter 220 shown in FIG. 3A prevents MoCA-only signals from reaching the external network 205 using the combination of filters and splitters shown in FIG. 3A. For example, the entry adapter 220 may include a directional coupler/splitter 222, a splitter 223, a diplex filter 224, and a splitter 226.

Figure 3B:
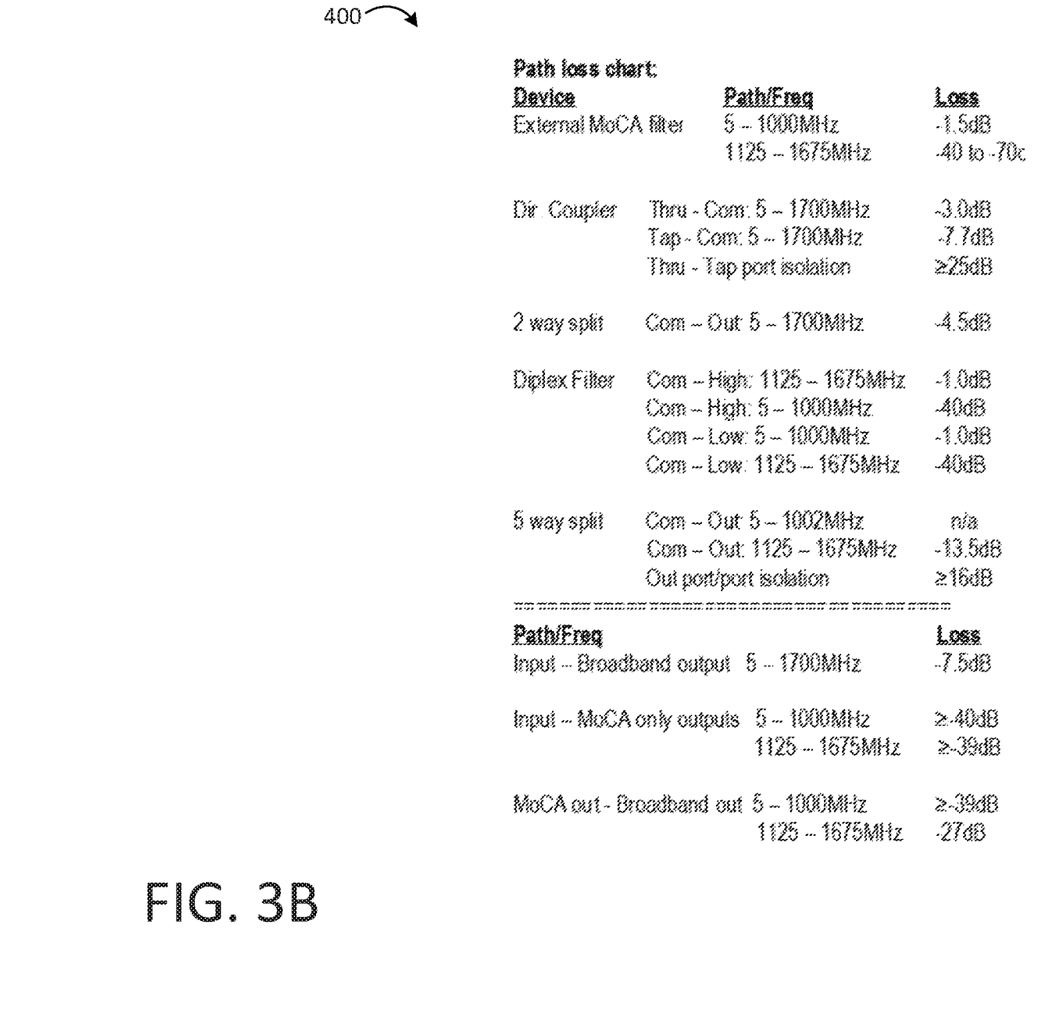
FIG. 3B illustrates a table that summarizes example filtering properties of one or more filtering devices used in the environment of FIG. 3A and an amount of loss produced between different connection paths within the environment of FIG. 3A.

In embodiments, the filters and splitters are configured to filter signals in accordance with table 400 shown in FIG. 3B (e.g., to prevent MoCA-only signals from reaching the external network 205 while allowing the broadband devices 250 to access the external network 205). More specifically, in operation, a broadband signal received at the input port 221 (e.g., from the external network 205) may pass through the entry adapter 220 (e.g., at broadband output ports 228 via the two-way splitter 223) to minimize signal loss from the input to broadband output path loss. Thus, any broadband device 250 connected to the broadband output port 228 will be able to "see" (e.g., detect and access) the full cable network signal spectrum received at the input port 221 (thus allowing the connected broadband devices 250 to access the external network 205 to receive cable television and/or Internet connectivity services). For example, referring to FIG. 3B, the loss from the input port 221 and the broadband output ports 228 is −7.5 dB only (including the loss from the two-way splitter 223), thus allowing the connected broadband devices 250 to access the external network 205.

Further, in operation, MoCA-only signals generated by the broadband devices 250 are combined at the splitter 223 and may enter the common (COM) port of the directional coupler/splitter 222 with a portion of the MoCA-only signal sent to the input port 221 and another portion sent to the entry adapter 220 tap port. In turn, the external MoCA band rejection filter 210 reflects the MoCA-only signal back to the input port 221 and blocks this MoCA-only signal from entering the external network 205. The MoCA-only signal at the directional coupler/splitter 222 tap port may pass through a diplex filter 224 having a high-pass terminal (H) and a low-pass terminal (L) connected to resistor 225. As shown in FIG. 3B, the high-pass terminal allows high frequencies associated with MoCA-only signals to pass (e.g., 1125 MHz-1675 MHz), while filtering low frequencies (e.g., from five MHz to 1000 MHz, by causing a 40-dB loss at these frequencies). The MoCA-only signal (e.g., those from the high-pass filter) may then be distributed through a splitter 226 (e.g., a five-way splitter) through which the MoCA-only signal is received by the connected client MoCA-only devices 240 (e.g., via the MoCA-only output ports 230).

MoCA-only signals generated by the MoCA-only devices 240 return to the MoCA-only output ports 230 and are combined together through the splitter 226. Subsequently, these MoCA-only signals may be passed through the diplex filter 224 to be filter out low frequencies (e.g., the non-MoCA-only signals), and present the remaining signal (e.g., the MoCA-only signals) to the broadband device 250 via the broadband output port 228, thus completing the MoCA communications loop. As low frequencies are filtered out, any MoCA-only signals that exit the entry adapter 220 via the input port 221 are reflected back by the external MoCA band rejection filter 210, preventing these MoCA-only signals from reaching the external network 205.

In some implementations, and referring to FIG. 3B, the entry adapter 220 may provide approximately 16 decibels (dB) of isolation (e.g., at the Thru-Tap port path), which may serve, along with a loss of splitter 226 (of about 9 dB), to provide sufficient amount of isolation from the MoCA-only ports 230 to the input port 221. In some implementations, the high-pass terminal of the diplex filter 224 may provide sufficient filtering to further limit the lower frequency energy (e.g., below 1000 MHz) that may be present on the MoCA-only ports 230 from getting to either the external network 205 or any broadband device 250 device connected to the broadband output port 228. The low-pass terminal of the diplex filter 224 may be terminated to ground via a resistor 225 to avoid reflections and provide a consistent return loss to the broadband output port 228, thereby facilitating functionality of the broadband devices 250. In some implementations, the resistor 225 may be have a resistance of 75 ohms, or may have any other suitable resistance.

As further shown in FIG. 3B, from the path between the input port 221 and the MoCA-only output ports 230, the entry adapter 220 (e.g., through the filtering properties and arrangement of the directional coupler/splitter 222, the splitter 223, the diplex filter 224, the resistor 225, and the splitter 226) provides a loss of greater than or equal to 40 dB for frequencies between five MHz and 1000 MHz for, and a loss of greater than or equal to 39 dB for frequencies between 1125 MHz and 1675 MHz. That is, the entry adapter 220 substantially attenuates communication signals in the path from the MoCA-only output ports 230 and the input port 221, thus preventing any communication signals from the MoCA-only devices 240 from reaching the external network 205. Further, from the path between the MoCA-only output ports 230 and the broadband output port 228, the entry adapter 220 provides a loss of greater than or equal to 39 dB for frequencies between five MHz and 1000 MHz, and a loss of 27 dB for frequencies between 1125 MHz and 1675 MHz. That is, the entry adapter 220 permits communications to occur between the broadband devices 250 and the MoCA-only device 240 via MoCA-only signals (e.g., signals in the 1125 MHz to the 1675 MHz range).

In embodiments, the entry adapter 220 may have a different number of ports than shown in FIGS. 1A and 1B. For example, the entry adapter 220 may include three ports (e.g., one input port 221, one broadband output port 228, and one MoCA-only port 230). In practice, any number of ports may be implemented in which more ports may be provided to provide connectivity to more devices in exchange for greater signal loss. In embodiments, additional splitters may be incorporated external to the entry adapter 220 to provide additional connectivity to additional devices as needed.

The foregoing description provides illustration and description, but is not intended to be exhaustive or to limit the possible implementations to the precise form disclosed. Modifications and variations are possible in light of the above disclosure or may be acquired from practice of the implementations. For example, one or more elements shown as separate components may be integrated together, whereas one or more components maybe separated or split into sub-components or elements. For example, any one or combination of the directional coupler/splitter 222, diplex filter 224, resistor 225, splitter 226, and/or other components may be integrated or implemented as separate components.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
   a band rejection filter connected to an external network and physically remote and outside of a customer premises, wherein the band rejection filter is configured to prevent signals from a frequency band associated with internal network communications from reaching the external network;
   an entry adapter connected to the external network via the band rejection filter, the entry adapter comprising a directional coupler to split an input signal from the external network into a first leg and a second leg, the first leg connecting to a first type of device and the second leg connecting to a second type of device wherein the directional coupler is configured to permit communications between the first type of device and the external network, permit communications between the first type of device and the second type of device via an internal network, and prevent communications between the second type of device and the external network; and
   wherein the directional coupler comprises a microstrip coupler having a pair of parallel conductors separated by a gap that is configured to prevent passage of signals within a first frequency band and traveling from the one or more second types of devices to the external network and permits signals within a second frequency band to travel from the second type of device to the first type of device.

2. The system of claim 1, wherein the gap is configured to only allow a signal at a predetermined minimum frequency to pass between the first parallel conductor and the second parallel conductor.

3. A system comprising:
   a band rejection filter connected to an external network and physically remote and outside of a customer premises, wherein the band rejection filter is configured to prevent signals from a frequency band associated with internal network communications from reaching the external network;
   an entry adapter connected to the external network via the band rejection filter, the entry adapter including a directional coupler to split an input signal from the external network into a first leg and a second leg, the first leg connecting to a first type of device and the second leg connecting to a second type of device;
   wherein the directional coupler includes a first parallel conductor defining the first leg and a second parallel conductor defining the second leg, the first parallel conductor and the second parallel conductor define a gap between the first and second parallel conductors; and
   wherein the gap is configured to only allow a signal at a predetermined minimum frequency to pass between the first parallel conductor and the second parallel conductor.

4. The system of claim 3 wherein the directional coupler is configured to:

permit communications between the first type of device and the external network; and permit communications between the first type of device and the second type of device via an internal network.

5. The system of claim 4 wherein the directional coupler is configured to:
prevent communications between the second type of device and the external network.

6. A system comprising:
a band rejection filter configured to be connected to an external network;
an entry adapter connected to the band rejection filter, the entry adapter configured to be connected to a first type of device and a second type of device that communicate with each other via network signals within a customer premises local network;
wherein the entry adapter is configured to pass the network signals within a first frequency band between the first type of device and the second type of device through a directional coupler having a first parallel conductor and a second parallel conductor connected to the first type and the second type of devices;
wherein the entry adapter is configured to terminate signals transmitted between the first type of device and the second type of device at a second frequency band lower than the first frequency band, and the directional coupler is configured to attenuate the network signals within the second frequency band from reaching an input port of the entry adapter from the second type of device;
wherein the band rejection filter is configured to filter the network signals within the second frequency band to prevent the network signals within the second frequency band from reaching the external network;
wherein the first and second parallel conductors define a gap between the first and second parallel conductors; and
wherein the gap is configured to only allow a signal at a predetermined minimum frequency to pass between the first parallel conductor and the second parallel conductor.

7. The system of claim 6, wherein:
the first type of device comprises a broadband device;
the second type of device comprises a Multimedia over Coax Alliance (MoCA) device;
the first frequency band carries internal network or MoCA data; and the second frequency band carries broadband data.

8. The system of claim 7, wherein the entry adapter is configured to attenuate the network signals using the directional coupler that attenuates based on signal direction and is direction-sensitive.

9. The system of claim 6, wherein the entry adapter is further configured to permit communications between the first type of device and the external network.

10. The system of claim 7, wherein the band rejection filter is configured to filter signals within the first frequency band to prevent the signals within the first frequency band from reaching the external network.

11. The system of claim 7, wherein the external band rejection filter is configured to permit signals within the second frequency band to pass through to the external network.

12. The system of claim 11, wherein signals within the second frequency band produced by the first type of device reach the external network and wherein signals within the first frequency band produced by the second type of device are reflected back by the band rejection filter and prevented from reaching the external network.

13. The system of claim 12, wherein the signals within the second frequency band transmitted to or from the first type of device comprise a loss of less than approximately 3 decibels.

14. A system configured to be connected to an external network, comprising:
an entry adapter configured to receive signals from an external network, the entry adapter including a directional coupler to split an input signal from the external network into a first leg and a second leg, the first leg connecting to a first type of device and the second leg connecting to a second type of device;
wherein the directional coupler is configured to:
permit communications between the first type of device and the external network;
permit communications between the first type of device and the second type of device via an internal network; and
prevent communications between the second type of device and the external network;
wherein the directional coupler comprises a microstrip coupler having a pair of parallel conductors separated by a gap;
wherein the gap prevents passage of signals within a first frequency band and traveling from the second type of device to the external network; and
wherein the gap permits signals within a second frequency band to travel from the second type of device to the first type of device.

15. The system of claim 14, wherein the gap is configured to only allow a signal at a predetermined minimum frequency to pass between the pair of parallel conductors.

16. The system of claim 14, wherein:
the first type of device comprises a broadband device;
the second type of device comprises a Multimedia over Coax Alliance (MoCA) device;
the first frequency band carries internal network or MoCA data; and
the second frequency band carries broadband data.

17. The system of claim 14, wherein the entry adapter is configured to attenuate the network signals using the directional coupler that attenuates based on signal direction and is direction-sensitive.

18. The system of claim 14, wherein the signals within the second frequency band transmitted to or from the first type of device comprise a loss of less than approximately 3 decibels.

19. The system of claim 18, wherein the gap is configured to only allow a signal at a predetermined minimum frequency to pass between the pair of parallel conductors.

20. A system comprising:
an entry adapter connected to an external network, the entry adapter including a directional coupler to split an input signal from the external network into a first leg and a second leg, the first leg connecting to a first type of device and the second leg connecting a second type of device;
wherein the directional coupler includes a first parallel conductor and a second parallel conductor that define a gap between the first and second parallel conductors;
wherein the gap is configured to only allow a signal at a predetermined minimum frequency to pass between the first parallel conductor and the second parallel conductor;

wherein the gap prevents passage of signals within a first frequency band and traveling from the second type of device to the external network; and wherein the gap permits signals within a second frequency band to travel from the second type of device to the first type of device.

21. The system of claim 20, wherein the directional coupler is configured to:

permit communications between the first type of device and the external network; and permit communications between the first type of device and the second type of device via an internal network.

22. The system of claim 21 wherein the directional coupler is configured to:

prevent communications between the second type of device and the external network.

23. The system of claim 20, wherein:

the first type of device comprises a broadband devices device;

the second type of device comprises a Multimedia over Coax Alliance (MoCA) device;

the first frequency band carries internal network or MoCA data; and the second frequency band carries broadband data.

\* \* \* \* \*